United States Patent [19]
Wada et al.

[11] Patent Number: 5,289,508
[45] Date of Patent: Feb. 22, 1994

[54] CLOCK INFORMATION TRANSMITTING DEVICE AND CLOCK INFORMATION RECEIVING DEVICE

[75] Inventors: Yoshiyuki Wada, Kawasaki; Toshihiro Yamanaka, Fukuoka, both of Japan

[73] Assignee: Fujitsu Limited, Kawasaki, Japan

[21] Appl. No.: 791,870

[22] Filed: Nov. 13, 1991

[30] Foreign Application Priority Data

Nov. 30, 1990 [JP] Japan .................. 2-340118

[51] Int. Cl.5 ............................................. H03D 3/24
[52] U.S. Cl. ................................. 375/120; 375/81; 375/110; 348/472; 348/525
[58] Field of Search ............... 375/120, 110, 94, 81; 358/13, 19, 148, 141, 153, 160, 186, 188

[56] References Cited

U.S. PATENT DOCUMENTS

| | | |
|---|---|---|
| 3,971,888 | 7/1976 | Ching et al. |
| 4,127,866 | 11/1978 | Yamashita ............... 358/19 |
| 4,727,432 | 2/1988 | Hosaka ................... 358/148 |
| 4,853,781 | 8/1989 | Okano et al. ............ 358/148 |
| 4,956,707 | 9/1990 | Oakley et al. .......... 358/185 |

FOREIGN PATENT DOCUMENTS 51305 1/1979 Japan .
59-178034 9/1984 Japan .

Primary Examiner—Stephen Chin
Assistant Examiner—Don N. Vo

[57] ABSTRACT

A clock information transmitting device coupled to a digital processing circuit which receives a transmission signal and generates a coded transmission signal includes a PLL circuit for generating a first signal and a sampling clock signal, both being synchronized with a synchronizing signal in the transmission signal. The sampling clock signal is used in the digital processing circuit. A clock information generating part counts pulses of a transmission clock signal and generates clock information indicating a number of pulses of a transmission clock signal in response to one of the synchronizing signal and the first signal generated by the PLL circuit. A multiplexer outputs a multiplexed signal including the clock information and the coded transmission signal to a transmission path.

21 Claims, 9 Drawing Sheets

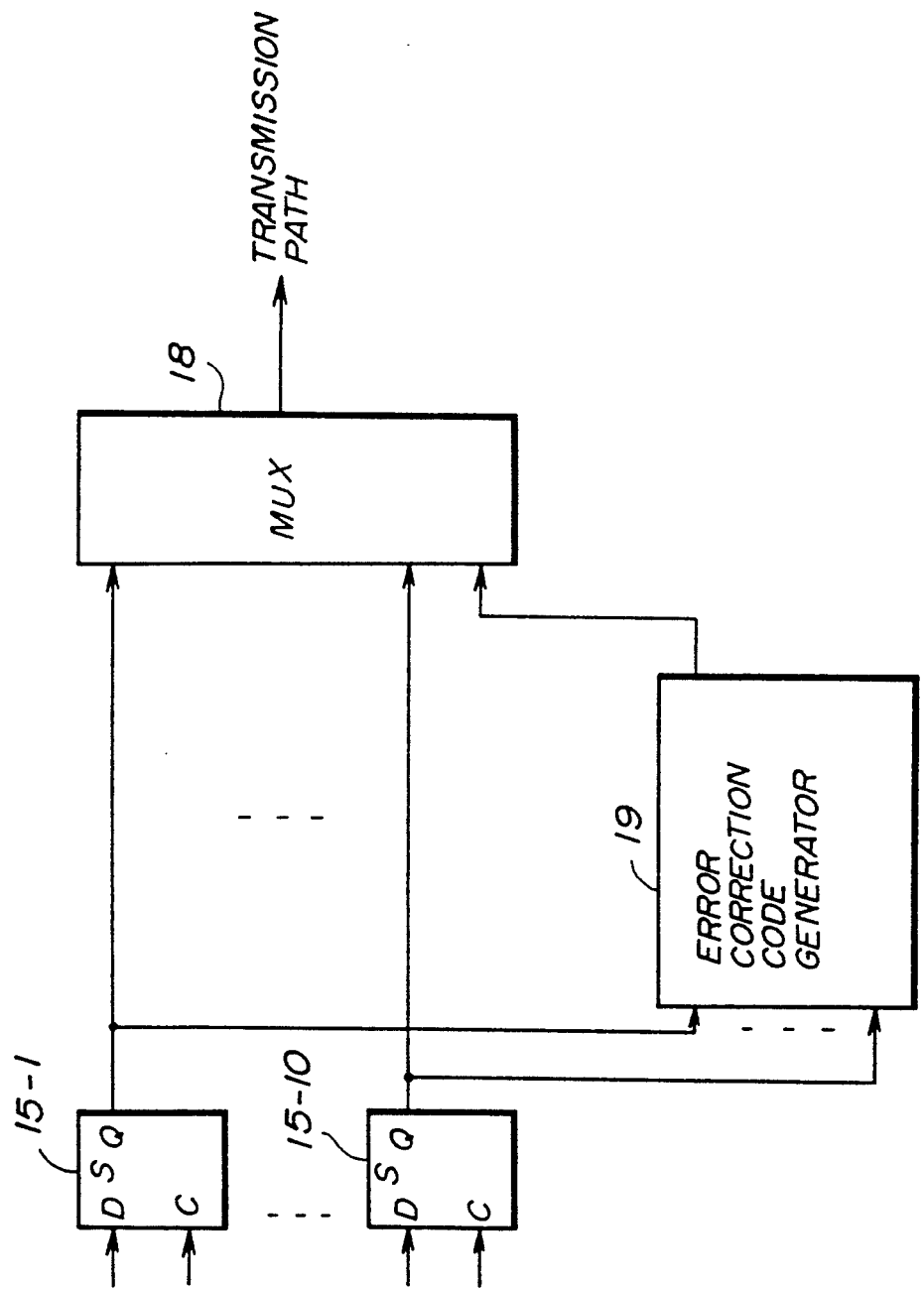

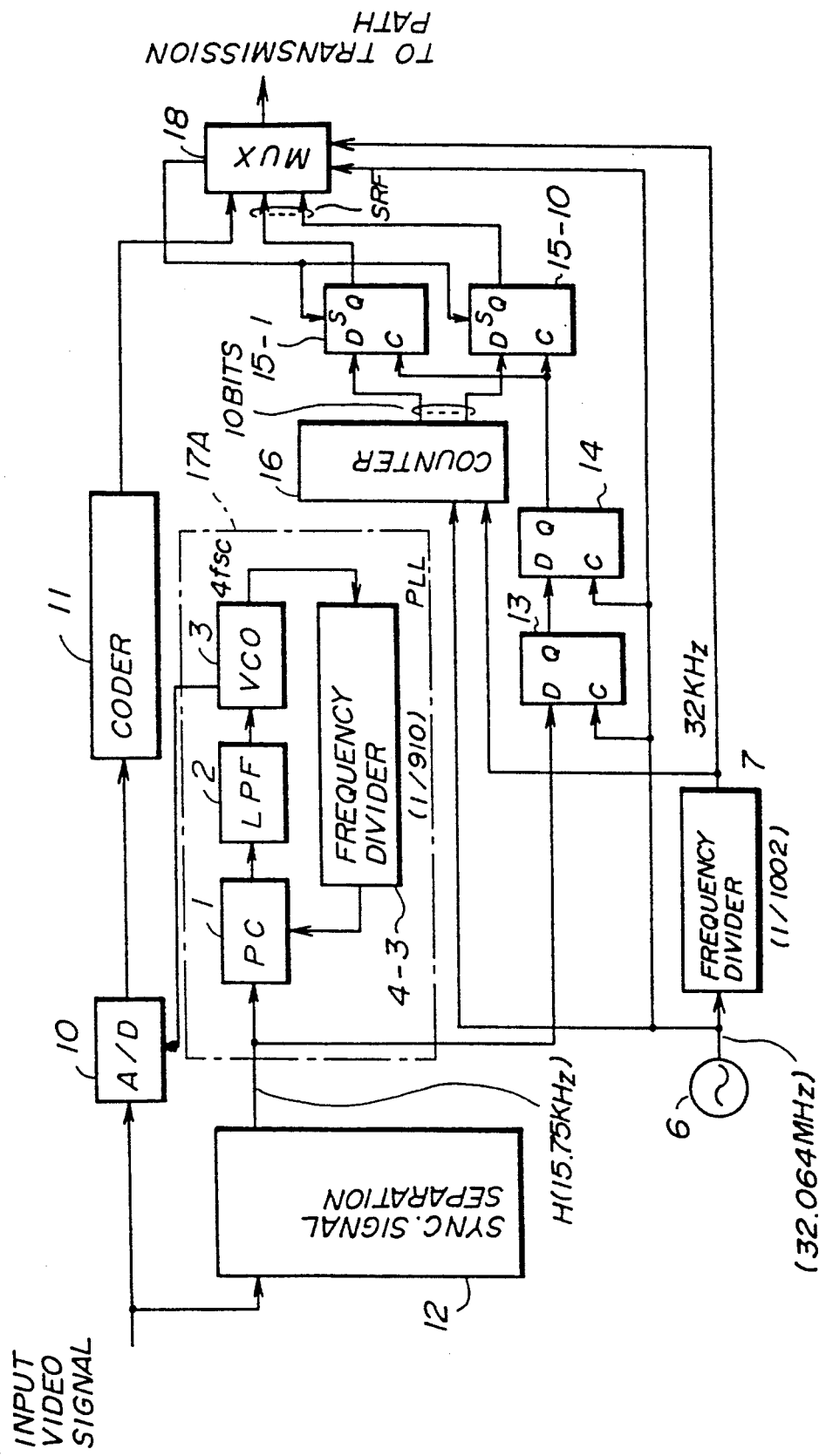

CLOCK INFORMATION TRANSMITTING DEVICE AND CLOCK INFORMATION RECEIVING DEVICE

BACKGROUND OF THE INVENTION

(1) Field of the Invention

The present invention generally relates to a synchronous communication system, such as a video transmission system. More specifically, the present invention is concerned with a device which transmits clock information about a clock signal used for sampling a video signal on the transmitter side, and a device which derives the clock signal from the clock information received via a transmission path in order to reproduce the video signal on the receiver side.

(2) Description of the Prior Art

In a synchronous communication system, it is necessary to transmit a clock signal used on the transmitter side to the receiver side in order to reproduce a video signal transmitted from the transmitter side. Conventionally, a synchronous method based on a stuffing technique is used for transmitting, to the receiver side, the clock signal used on the transmitter side. Another method is known, in which clock information is inserted into data transmitted to the receiver side. The present invention is concerned with the latter type.

FIG. 1A is a block diagram of a conventional clock information transmitting device. A horizontal synchronizing signal H is separated, by a synchronizing signal separator, from an input video signal which is generated by a video signal processing circuit (not shown) and is to be transmitted to the receiver side. The separated horizontal synchronizing signal H is input to a PLL (Phase-Locked Loop) circuit 5. As shown in FIG. 1A, the PLL circuit 5 is composed of a phase comparator (PC) 1, a lowpass filter (LPF) 2, a voltage-controlled oscillator (VCO) 3, and a frequency divider 4. The phase comparator 1 has a first input terminal receiving the horizontal synchronizing signal H, and an output signal of the frequency divider 4. The output signal of the frequency divider 4 has a frequency equal to $[1/(455\times2)]$ times that of an output signal (sampling clock signal) of the voltage-controlled oscillator 3. The frequency of the sampling clock signal of the voltage-controlled oscillator 3 is four times the frequency $f_{SC}$ (=3.58 MHz) of a color sub-carrier signal ($4f_{SC}=4\times3.58$ MHz) according to the NTSC standard. Thus, the output signal from the frequency divider 4 has a frequency equal to that of the horizontal synchronizing signal H (15.75 kHz).

The phase comparator 1 obtains the phase difference between the horizontal synchronizing signal H and the output signal of the frequency divider 4, and outputs a voltage signal corresponding to this phase difference to the voltage-controlled oscillator 3 via the lowpass filter 2. The oscillation frequency of the voltage-controlled oscillator 3 is based on the voltage signal from the lowpass filter 2. The sampling clock signal generated by the voltage-controlled oscillator 3 is output not only to the frequency divider 4 but also to one of two input terminals of a counter 8. The other input terminal of the counter 8 receives an output signal of a frequency divider 7, which frequency-divides a transmission clock signal $f_L$ generated by a clock generator 6. The transmission clock signal generated by the clock generator 6 has a frequency $f_L$ equal to 32.064 MHz.

The counter 8 counts the number of pulses contained in the sampling clock signal ($4f_{SC}$) which are obtained during an interval between two consecutive pulses of the clock signal from the frequency divider 7. In FIG. 1A, the number of pulses obtained during the period is labeled as $\Delta S_S$. The counter value $\Delta S_S$ in the counter 8 is output to a multiplexer (MUX) 9, which also receives a coded video signal via a digital processing circuit (not shown for the sake of simplicity). The multiplexer 9 inputs the counter value $\Delta S_S$ into control (auxiliary) bits in a frame format of a multiplexed signal, which is output to a transmission path in synchronism with the transmission clock signal.

FIG. 1B is a block diagram of a clock information receiving device, which is composed of a demultiplexer (DMUX) 21, a PLL circuit 28 and a frequency divider 29. The multiplexed signal is received by the demultiplexer 21, which separates the control bits from the multiplexed signal. The counter value $\Delta S_S$ indicated by the control bits is output to the PLL circuit 28. The coded video signal from the demultiplexer 21 is output to a digital processing circuit (not shown for the sake of simplicity). The transmission clock signal $f_L$ from the demultiplexer 21 is input to the frequency divider 29, which frequency-divides the transmission clock signal $f_L$. A clock signal output by the frequency divider 29 has a frequency equal to that of the clock signal output by the frequency divider 7 shown in FIG. 1A.

The PLL circuit 28 is composed of a phase comparator (PC) 22, an adder 23, a flip-flop (FF) 24, a digital-to-analog (D/A) converter 25, a voltage-controlled oscillator (VCO) 26, and a counter 27. The counter value $\Delta S_S$ from the demultiplexer 21 is input to the phase comparator 22, which compares the counter value $\Delta S_S$ with a counter value $\Delta S_R$ in the counter 27, which counts the number of pulses contained in the output signal of the voltage-controlled oscillator 26 during an interval between two consecutive pulses of the clock signal from the frequency divider 29. The phase comparator 22 obtains the phase difference between the counter value $\Delta S_S$ and the counter value $\Delta S_R$, and outputs a voltage signal corresponding to the phase difference to an integration circuit composed of the adder 23 and the flip-flop 24. When the voltage signal output by the phase comparator 22 is 0 V, the flip-flop 24 generates 0 V. When the voltage signal output by the phase comparator 22 is a level other than 0 V, the flip-flop 24 generates an integrated value in digital form. The output signal of the flip-flop 24 is converted into an analog signal by the D/A converter 25. The output signal of the D/A converter 25 adjusts the frequency of the oscillation signal generated by the voltage-controlled oscillator 26.

In the above-mentioned manner, the sampling clock signal is adjusted on the receiver side so that the counter value $\Delta S_R$ obtained on the receiver side always becomes equal to the counter value $\Delta S_S$ on the transmitter side. Hence, the sampling clock signal obtained on the receiver side always has the same frequency as that obtained on the transmitter side.

The conventional transmission system, however, has a disadvantage in that the PLL circuit 28 on the receiver side needs the D/A converter 25, hence making it very difficult to produce a compact clock information receiving device.

SUMMARY OF THE INVENTION

It is a general object of the present invention to provide a clock information transmitting device and a clock information receiving device in which the above-mentioned disadvantage is eliminated.

A more specific object of the present invention is to provide a clock information transmitting device capable of sending clock information which can be reproduced without a D/A converter on the receiver side, and to provide a clock information transmitting device which does not have a D/A converter used for reproducing the clock information.

The above objects of the present invention are achieved by a clock information transmitting device coupled to a digital processing circuit which receives a transmission signal and generates a coded transmission signal, comprising: signal separation means for separating a synchronizing signal from the transmission signal; PLL means, coupled to the signal separation means, for generating a first signal and a sampling clock signal, both signals being synchronized with the synchronizing signal, the sampling clock signal being used in the digital processing circuit; clock information generating means, coupled to the PLL means, for counting pulses of a transmission clock signal and for generating clock information indicating a number of pulses of a transmission clock signal in response to one of the synchronizing signal and the first signal generated by the PLL means; and multiplexer means, coupled to the digital processing circuit and the clock information generating means, for outputting a multiplexed signal including the clock information and the coded transmission signal to a transmission path.

The above-mentioned objects of the present invention are achieved by a clock information receiving device coupled to a processing circuit which decodes a coded transmission signal contained in a multiplexed signal received via a transmission path, the clock information receiving device comprising: counter means for counting pulses of a transmission clock signal contained in the multiplexed signal during each predetermined period and for outputting a counter value indicating the number of counted pulses of the transmission clock signal; matching detection means, coupled to the counter means, for generating a detection signal when the counter value in the counter means becomes equal to a counter value indicated by clock information included in the multiplexed signal; and PLL means, coupled to the matching detection means, for generating a sampling clock signal synchronized with the detection signal, the sampling clock signal being used in the digital processing circuit.

BRIEF DESCRIPTION OF THE DRAWINGS

Other objects, features and advantages of the present invention will become more apparent from the following detailed description when read in conjunction with the accompanying drawings, in which:

FIG. 4 is a block diagram of a variation of the first preferred embodiment of the present invention;

FIG. 5A is a block diagram of a clock information transmitting device according to a second preferred embodiment of the present invention;

DESCRIPTION OF THE PREFERRED EMBODIMENTS

Figure 1A:
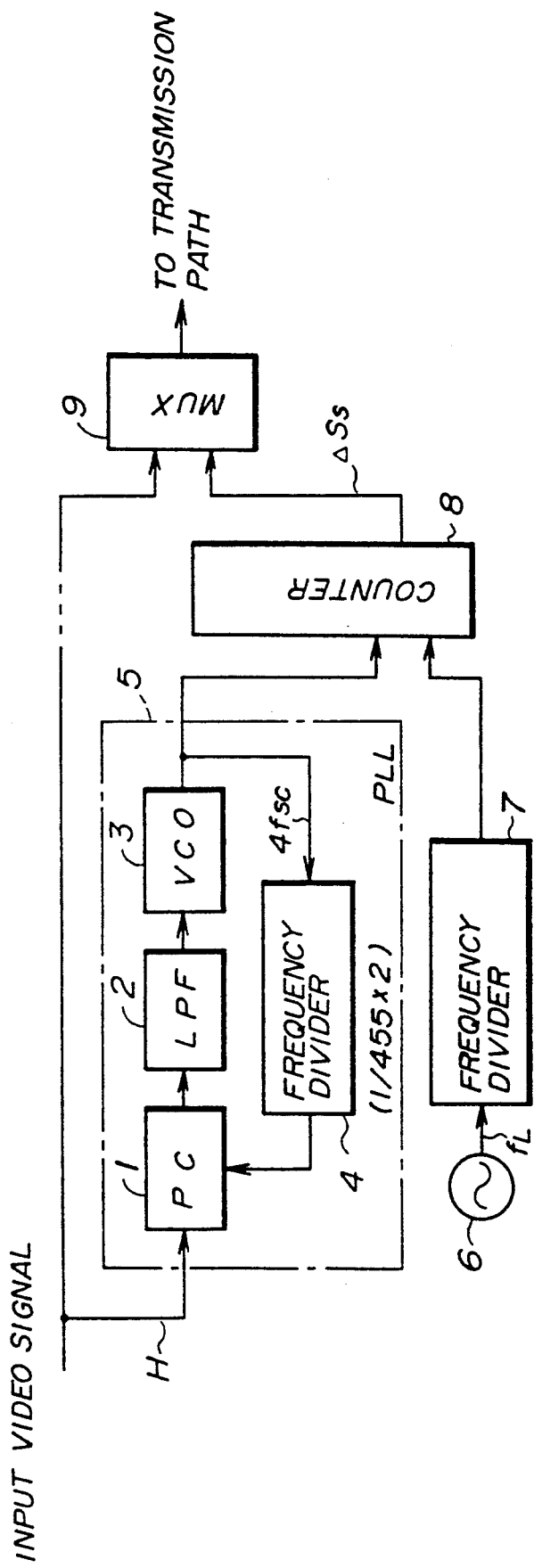
FIG. 1A is a block diagram of a conventional clock information transmitting device.
Figure 2A:
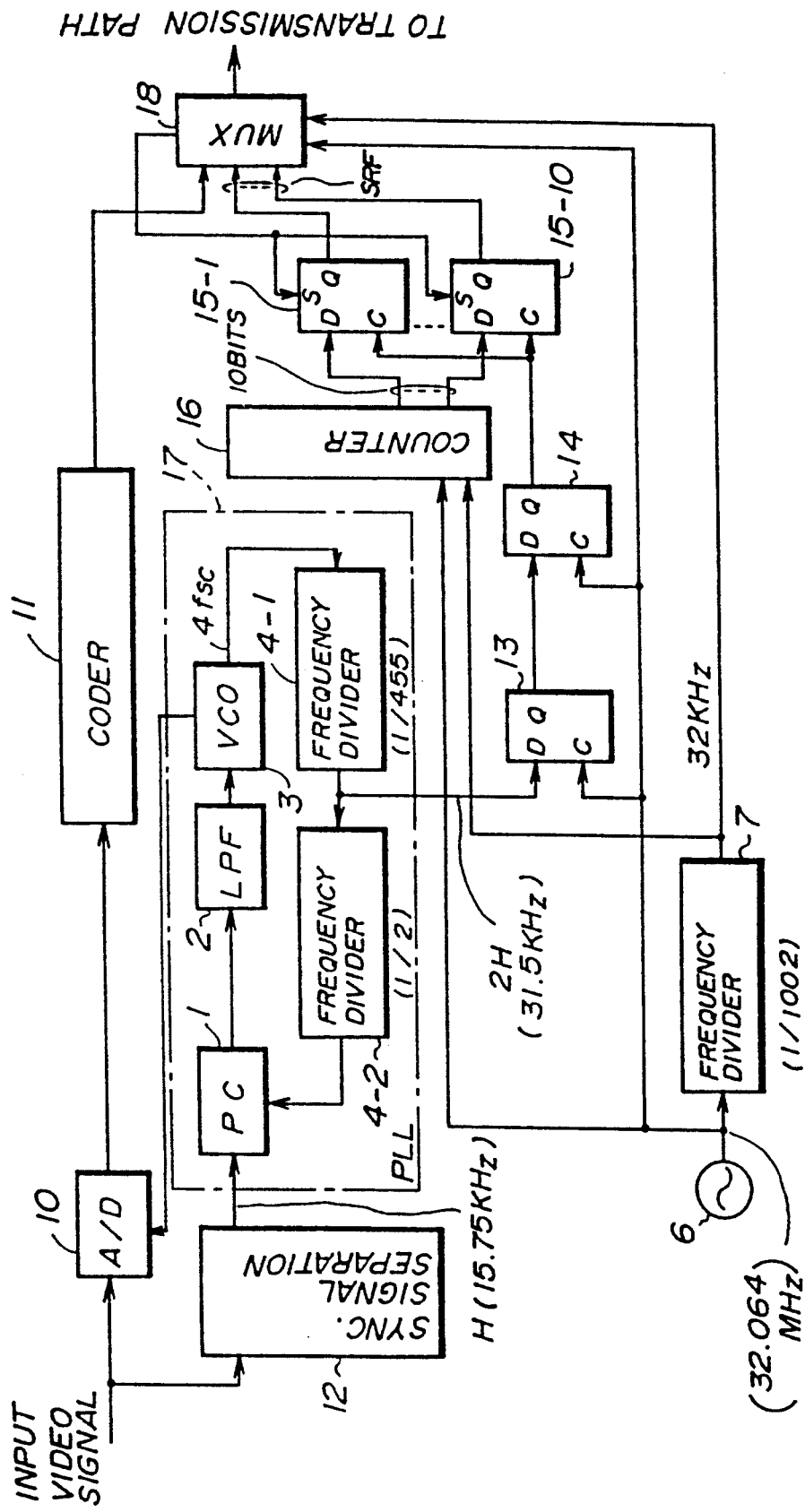
FIG. 2A is a block diagram of a clock information transmitting device according to a first preferred embodiment of the present invention.

FIG. 2A shows a clock information transmitting device according to a first preferred embodiment of the present invention. In FIG. 2A, those parts which are the same as those shown in FIG. 1A are given the same reference numerals. As shown in FIG. 2A, the clock information transmitting device is composed of an A/D converter 10, a video coding circuit 11, a synchronizing signal separator 12, two D-type flip-flops 13 and 14, a plurality of D-type flip-flops 15-1-15-10, a counter 16, a PLL circuit 17 and a multiplexer 18 in addition to the clock generator 6 and the frequency divider 7. The PLL circuit 17 is composed of the program counter 1, the lowpass filter 2, the voltage-controlled oscillator 3, and two frequency dividers 4-1 and 4-2.

An analog input video signal in conformity with, for example, the NTSC standard, is input to the A/D converter 10 and the synchronizing signal separator 12. The A/D converter 10 converts the analog input video signal into a digital video signal, which is input to the video coding circuit 11. The digital video signal is coded and coded video data is input to the multiplexer 18. The A/D converter 10 and the video coding circuit 11 form a digital processing circuit.

The synchronizing signal separator 12 separates the horizontal synchronizing signal H having a frequency of 15.75 kHz from the analog input video signal. The separated horizontal synchronizing signal H is input to the phase comparator 1 and compared with a signal obtained at the output terminal of the frequency divider 4-2. A sampling clock signal having the frequency $4f_{SC}$ (=4×3.58 MHz) is divided, by the frequency divider 4-1, at a rate of 1/455, and an output signal 2H of the frequency divider 4-1 is divided, by the frequency divider 4-2, at a rate of ½. The output signal of the frequency divider 4-2 has a frequency of about 15 kHz. The phase comparator 1 obtains the phase difference between the horizontal synchronizing signal H and the output signal of the frequency divider 4-2, and outputs a voltage signal based on the phase difference to the lowpass filter 2. A DC component of the voltage signal generated by the phase comparator 1 is extracted by the lowpass filter 2, and applied to the voltage-controlled oscillator 3. The frequency of the sampling clock signal generated by the voltage-controlled oscillator 3 is adjusted based on the DC component from the lowpass filter 2. The sampling clock signal is used in, for example, the A/D converter 10.

The output signal 2H of the frequency divider 4-1 having a frequency equal to $4f_{SC}/455$ (=31.5 kHz) is applied to a data terminal D of the flip-flop 13, which receives the transmission clock signal (32.064 MHz) generated by the clock generator 6 via its clock terminal. Hence, the clock signal 2H which has a frequency of 31.5 kHz and is synchronized with the transmission clock signal is generated via an output terminal Q of the flip-flop 13. The clock signal obtained via the output terminal Q of the flip-flop 13 is applied to a data terminal D of the flip-flop 14, which also receives the transmission clock signal generated by the clock generator 6 via its clock terminal C. A 31.5 kHz clock signal synchronized with the transmission clock signal is output, via an output terminal Q of the flip-flop 14, to a clock terminal C of each of the flip-flops 15-1-15-10.

The counter 16 receives the 32.064 MHz transmission clock signal generated by the clock generator 6 and the output signal of the frequency divider 7 having a frequency of 32 kHz (=(1/1002)×32.064 MHz). The counter 16 counts the number of pulses contained in the transmission clock signal during an interval between two consecutive pulses of the clock signal output by the frequency divider 7. The counter 16 is initialized each time the pulse of the 32 kHz clock signal from the frequency divider 7 is applied to the counter 16. The counter 16 has an 10-bit output signal, 10 bits of which are output respectively to the data terminals D of the flip-flops 15-1-15-10.

The flip-flops 15-1-15-10 receive the clock signal which is output by the flip-flop 14 and has a frequency twice the frequency of the horizontal synchronizing signal H. In response to this clock signal, the flip-flops 15-1-15-10 respectively output one-bit output signals to the multiplexer 18 as clock information (reference information) $S_R$ F. It will be noted that the clock information $S_R$ F indicates the counter value in the counter 16. The multiplexer 18 receives the coded video signal from the video coding circuit 11, the 10 bits of the flip-flops 15-1-15-10, the 32 kHz clock signal from the frequency divider 7, and the 32.064 MHz transmission clock signal generated by the clock generator 6, and creates frames, each having a period of 32 kHz (1002 bits). The multiplexer 18 sets the flip-flops 15-1-15-10 to a predetermined value equal to, for example, 1023, in response to the 32 kHz clock signal, which is applied to a terminal S of each of the flip-flops 15-1-15-10.

Figure 3:
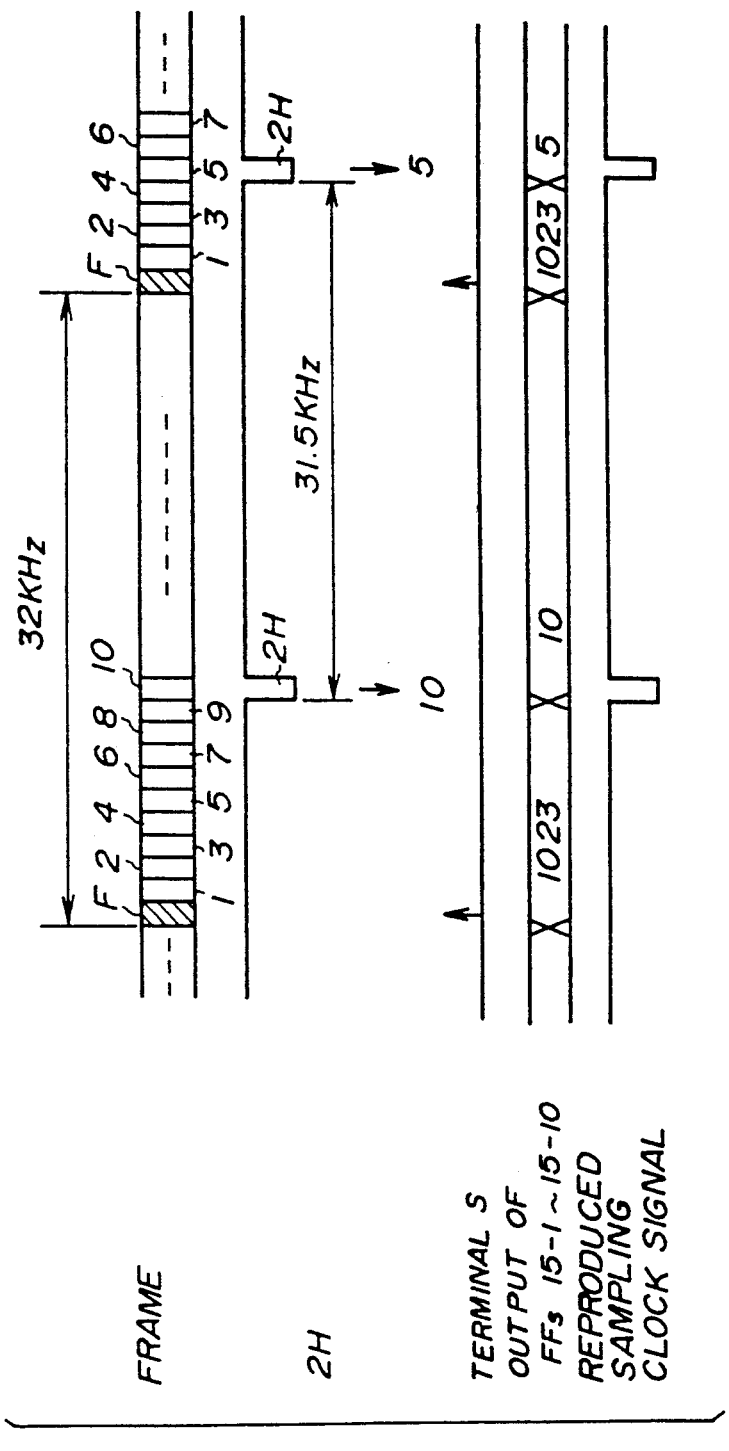
FIG. 3 is a waveform diagram showing the operation of the first preferred embodiment of the present invention.

FIG. 3 shows the operation of the clock information transmitting device shown in FIG. 2A. One frame consists of 1002 bits and has a frequency of 32 kHz. Each frame starts from a frame bit F. Then, the counter 16 increases its counter value each time the pulse generated by the clock generator 6 is applied. When a pulse signal having the frequency (31.5 kHz) twice that of the horizontal synchronizing signal H is generated, the counter value of the counter 16 is "10". When the next pulse signal is generated, the counter value is "5". These counter values are output to the multiplexer 18 as the clock information $S_R$ F. Each time the signal is applied to the terminals S of the flip-flops 15-1-15-10, each flip-flop 15-1-15-10 is controlled so as to output "1", so that the value "1023" is output to the multiplexer 18. The multiplexer 18 inputs the counter value into predetermined control bits, which are multiplexed with the coded video data from the video coding circuit 11 so that one frame consists of 1002 bits and has a frequency of 32 kHz. The multiplexed signal thus formed is transferred to a transmission path at the frequency of the transmission clock signal having a frequency of 32.064 MHz.

Figure 1B:
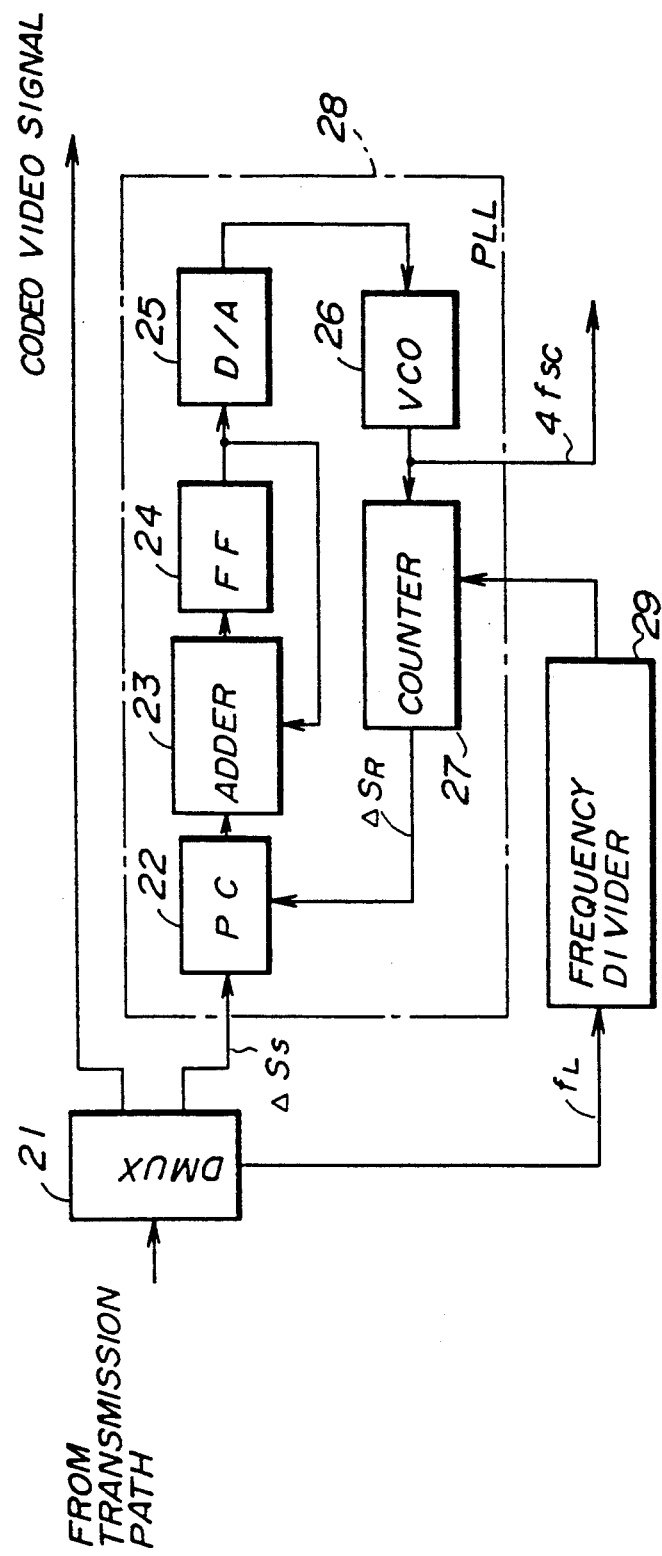
FIG. 1B is a block diagram of a conventional clock information receiving device.
Figure 2B:
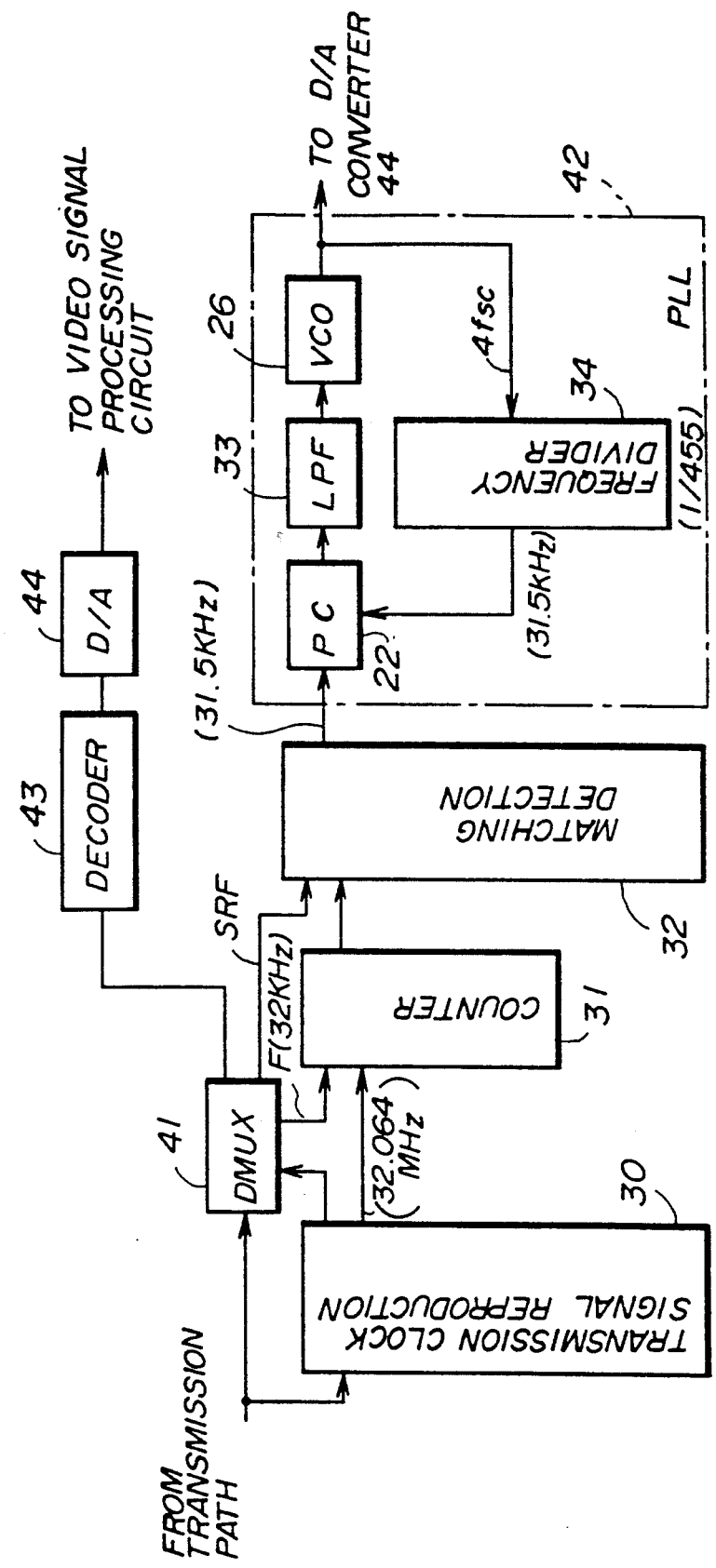
FIG. 2B is a block diagram of a clock information receiving device according to the first preferred embodiment of the present invention.

FIG. 2B is a block diagram of a clock information receiving circuit according to the first preferred embodiment of the present invention. In FIG. 2B, those parts which are the same as those shown in FIG. 1B are given the same reference numerals. As shown, the clock information receiving circuit is composed of a transmission clock reproduction circuit 30, a counter 31, a matching detection circuit 32, a demultiplexer (DMUX) 41 and a PLL circuit 42. The coded video signal is decoded by a decoder 43. The decoded signal is converted into an analog signal via a digital-to-analog converter 44. The decoder 43 and the D/A converter form a digital processing circuit. The PLL circuit 6 includes a frequency divider 34 in addition to the aforementioned phase comparator 22, lowpass filter 33 and voltage-controlled oscillator 26.

The multiplexed signal received via the transmission path is input to the demultiplexer 41 and the transmission clock reproduction circuit 30. The transmission clock reproduction circuit 30 reproduces the transmission clock signal from the received multiplexed signal. The reproduced transmission clock signal having a frequency of 32.064 MHz is applied to the demultiplexer 41 and the counter 31. The demultiplexer 41 separates the coded video data, the frame signal F and the clock information $S_R$ F formed by the control bits from one another. The frame signal F having a frequency of 32 kHz is applied to the counter 31, and the clock information $S_R$ F is input to the matching detection circuit 32.

The counter 31 starts to count the number of pulses of the 32.064 MHz transmission clock signal in response to the frame signal F. The counter value in the counter 31 is input to the matching detection circuit 32. When the counter value in the counter 31 becomes equal to the counter value indicated by the clock information $S_R$ F, the matching detection circuit 32 generates a detection pulse signal. In the case shown in FIG. 3, the matching detection circuit 32 generates a pulse signal when the counter value in the counter 31 becomes equal to "10". It will be noted that the pulse signal generated by the matching detection circuit 32 has a frequency of 31.5 kHz which is twice that of the horizontal synchronizing signal H generated by the PLL circuit 17 on the transmitter side (FIG. 2A).

The 31.5 kHz pulse signal generated by the matching detection circuit 32 is input to the phase comparator 22, which also receives the output signal of the frequency divider 34 having a frequency of 31.5 kHz. The sampling clock signal of the voltage-controlled oscillator 26 having a frequency $4f_{SC}$ is frequency-divided by the frequency divider 34 at a rate of 1/455. The phase comparator 22 outputs to the lowpass filter 33 a voltage signal based on the phase difference between the pulse signal from the matching detection circuit 32 and the output signal of the frequency divider 34. A DC component of the voltage signal is allowed to pass through the lowpass filter 33 and applied to the voltage-controlled oscillator 26. The oscillation frequency of the voltage-controlled oscillator 26 is adjusted based on the DC component from the lowpass filter 33. FIG. 3 shows a reproduced sampling clock signal.

In the above-mentioned manner, it becomes possible to produce, on the receiver side, the sampling clock signal synchronized with the sampling clock used on the transmitter side.

The first embodiment of the present invention has a possibility that the reproduced sampling clock signal may be degraded due to a change in the reference signal SRF arising from a transmission error. In order to eliminate this problem it is possible, as shown in FIG. 4, to provide an error correction code generator 19, which generates an error correction code, such as a BCH code, from the one-bit signals output by the flip-flops 15-1–15-10. On the receiver side, an error in the clock information $S_R F$ can be corrected by the error correction code.

FIG. 5A shows a clock information transmitting device according to a second preferred embodiment of the present invention. In FIG. 5A, those parts which are the same as those shown in FIG. 2A are given the same reference numerals. A PLL circuit 17A shown in FIG. 5A is substituted for the PLL circuit 17 shown in FIG. 2A. The PLL circuit 17A includes a frequency divider 4-3 in addition to the aforementioned phase comparator 1, the lowpass filter 2 and the voltage-controlled oscillator 3. The frequency divider 4-3 has a frequency dividing rate of 1/910, which is equal to the frequency dividing rate obtained by the combination of the frequency dividers 4-1 and 4-2 shown in FIG. 2A. The horizontal synchronizing signal H output by the synchronizing signal separator 12 is applied to the data terminal D of the flip-flop 13.

Figure 5B:
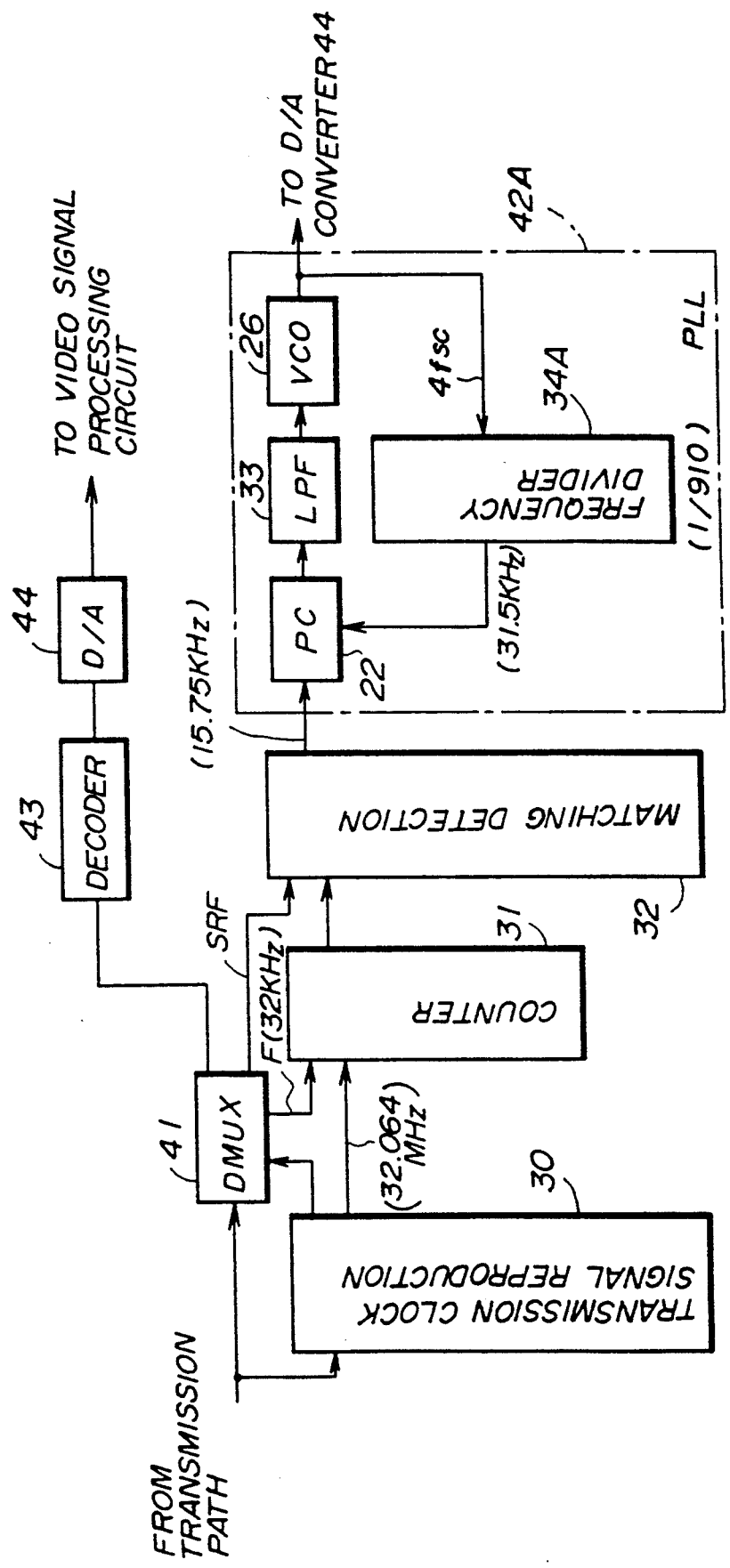
FIG. 5B is a block diagram of a clock information receiving device according to the second preferred embodiment of the present invention.
Figure 6:
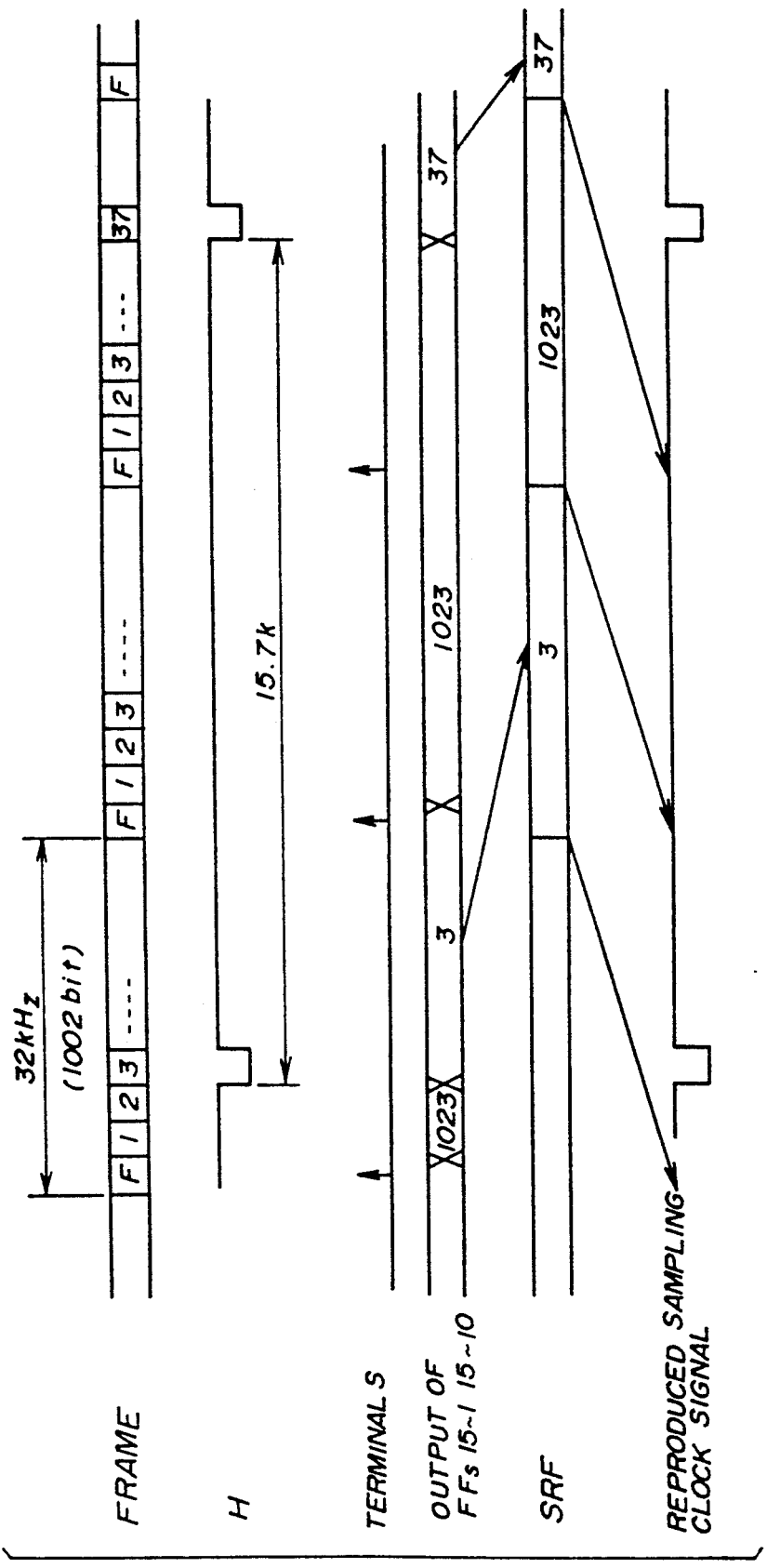
FIG. 6 is a waveform diagram showing the operation of the second preferred embodiment of the present invention.

FIG. 6 shows the operation of the configuration shown in FIG. 5A. The counter value in the counter 16 obtained when the horizontal synchronizing signal H is obtained is output to the receiver side. In the case shown in FIG. 6, when the horizontal synchronizing signal H is generated, the counter value in the counter 16 is "3". The counter value latched for the next time is "37" This counter value is latched by the flip-flops 15-1–15-10, and then applied to the multiplexer 18.

FIG. 5B shows a clock information receiving device according to the second preferred embodiment of the present invention. In FIG. 5B, those parts which are the same as those shown in FIG. 2B are given the same reference numerals. A PLL circuit 42A shown in FIG. 5B is substituted for the PLL circuit 42 shown in FIG. 2B. The PLL circuit 42A includes a frequency divider 34A in addition to the aforementioned phase comparator 22, the lowpass filter 33 and the voltage-controlled oscillator 26. The frequency divider 34A has a frequency dividing rate of 1/910. The operation of the clock information receiving device shown in FIG. 5B is the same as that of the clock information receiving device shown in FIG. 2B.

In the first and second embodiments, it is possible to replace the horizontal synchronizing signal H by a vertical synchronizing signal. The present invention can be applied to video signals in conformity with not only the NTSC standard but also the PAL or SECAM standard.

The present invention is not limited to the specifically disclosed embodiments, and variations and modifications may be made without departing from the scope of the present invention.

What is claimed is:

1. A clock information transmitting device coupled to a digital processing circuit which receives a transmission signal and generates a coded transmission signal, comprising:
    signal separation means for separating a synchronizing signal from the transmission signal;
    phase locked loop (PLL) means, coupled to said signal separation means, for generating a sampling clock signal and a first signal produced from said sampling clock signal, said sampling clock signal and said first signal being synchronized with the synchronizing signal, the sampling clock signal generated in the PLL mans being applied to and used in the digital processing circuit;
    clock information generating means for generating a transmission clock signal and being coupled to said PLL means, for counting pulses of the transmission clock signal and for generating clock information indicating a number of pulses of the transmission clock signal in response to the first signal generated by the PLL means; and
    multiplexer means, coupled to said digital processing circuit and said clock information generating means, for outputting a multiplexed signal including said clock information and said coded transmission signal to a transmission path,
    wherein said clock information generating means comprises:
    clock signal generating means for generating the transmission clock signal and a second signal having a frequency lower than that of the transmission clock signal, the multiplexed signal having a frequency equal to that of the transmission clock signal;
    counter means, coupled to said clock signal generating means, for counting pulses of the transmission clock signal during each period defined by said second signal; and
    latch means, coupled to said PLL means and said counter means, for latching a counter value in the counter means in response to the first signal generated by said PLL means, said counter value corresponding to said clock information.

2. A clock information transmitting device as claimed in claim 1, wherein said latch means comprises:
    first flip-flop means for synchronizing said first signal with the second signal and for generating a synchronized signal; and
    second flip-flop means for latching the counter value in synchronism with said synchronized signal.

3. A clock information transmitting device as claimed in claim 1, wherein said clock signal generating means comprises:
    a clock generator for generating the transmission clock signal; and
    a frequency divider for generating the second signal by frequency-dividing the transmission clock signal.

4. A clock information transmitting device as claimed in claim 1, wherein said PLL means comprises:
    oscillator means for generating the sampling clock signal used in said digital processing circuit and synchronized with the synchronizing signal; and
    frequency divider means, coupled to said oscillator means, for generating the first signal by frequency-dividing the sampling clock signal.

5. A clock information transmitting device as claimed in claim 4, wherein:
    said frequency divider means comprises a frequency divider for generating a third signal by frequency-dividing the first signal, said third signal having a frequency equal to that of the synchronizing signal; and
    said PLL means comprises phase comparator means for outputting a voltage signal based on a phase difference between the synchronizing signal and the third signal to said oscillator means, a frequency of the sampling clock signal being adjusted based on the voltage signal.

6. A clock information transmitting means as claimed in claim 6, wherein said PLL means comprises phase comparator means for outputting a voltage signal based on a phase difference between the synchronizing signal and the first signal to said oscillator means, a frequency of the sampling clock signal being adjusted based on the voltage signal.

7. A clock information transmitting means as claimed in claim 1, wherein said transmission signal is a video signal including a horizontal synchronizing signal corresponding to said synchronizing signal.

8. A clock information transmitting device as claimed in claim 1, wherein the first signal has a frequency twice that of the synchronizing signal.

9. A clock information transmitting device as claimed in claim 1, wherein the second signal has a frequency nearly equal to twice a frequency of the synchronizing signal.

10. A clock information transmitting means as claimed in claim 1, further comprising error correction code generating means, coupled to said clock information generating means, for generating an error correction code from said clock information and for adding the error correction code to the clock information.

11. A clock information receiving device coupled to a processing circuit which decodes a coded transmission signal contained in a multiplexed signal received via a transmission path, said clock information receiving device comprising:
    counter means for counting pulses of a transmission clock signal contained in the multiplexed signal during each predetermined period and for outputting a counter value indicating the number of counted pulses of the transmission clock signal;
    matching detection means, coupled to said counter means, for generating a detection signal when the counter value in the counter means becomes equal to a counter value indicated by clock information included in the multiplexed signal; and
    phase locked loop (PLL) means, to said matching detection means, for generating a sampling clock signal synchronized with the detection signal, said sampling clock signal being used in the digital processing circuit.

12. A clock information receiving device as claimed in claim 11, wherein said PLL means comprises:
    oscillator means for generating said sampling clock signal;
    frequency dividing means, coupled to said oscillator means, for generating a frequency-divided signal from the sampling clock signal; and
    phase comparator means, coupled to said matching detection means and said frequency divider means, for generating a voltage signal based on a phase difference between the detection signal and the sampling clock signal, the voltage signal adjusting a frequency of the sampling clock signal.

13. A clock information transmitting device coupled to a digital processing circuit which receives a transmission signal and generates a coded transmission signal, comprising:
    signal separation means for separating a synchronizing signal from the transmission signal;
    phase locked loop (PLL) means, coupled to said signal separation means, for generating a sampling clock signal, said sampling clock signal being synchronized with the synchronizing signal, the sampling clock signal being applied to and used in the digital processing circuit;
    clock information generating means for generating a transmission clock signal and being coupled to said PLL means, for counting pulses of the transmission clock signal and for generating clock information indicating a number of pulses of the transmission clock signal in response to the synchronizing signal;
    multiplexer means, coupled to said digital processing circuit and said clock information generating means, for outputting a multiplexed signal including said clock information and said coded transmission signal to a transmission path,
    wherein said clock information generating means comprises:
    clock signal generating means for generating the transmission clock signal and a further signal having a frequency lower than that of the transmission clock signal, the multiplexed signal having a frequency equal to that of the transmission clock signal;
    counter means, coupled to said clock signal generating means, for counting pulses of the transmission clock signal during each period defined by said further signal; and
    latch means, coupled to said signal separation means and said counter means, for latching a counter value in the counter means in response to said synchronizing signal, said counter value corresponding to said clock information.

14. A clock information transmitting device as claimed in claim 13, wherein said latch means comprises:
    first flip-flop means for synchronizing said synchronizing signal with said further signal and for generating a synchronized signal; and
    second flip-flop means for latching the counter value in synchronism with said synchronized signal.

15. A clock information transmitting device as claimed in claim 13, wherein said clock signal generating means comprises:
    a clock generator for generating the transmission clock signal; and
    a frequency divider for generating said further signal by frequency-dividing the transmission clock signal.

16. A clock information transmitting device as claimed in claim 13, wherein said PLL means comprises:
    oscillator means for generating the sampling clock signal used in said digital processing circuit and synchronized with the synchronizing signal; and
    frequency divider means, coupled to said oscillator means, for frequency-dividing the sampling clock signal.

17. A clock information transmitting device as claimed in claim 16, wherein:
    said frequency divider means comprises a frequency divider for generating a signal having a frequency equal to that of the synchronizing signal; and
    said PLL means further comprises phase comparator means for outputting a voltage signal based on a phase difference between the synchronizing signal and the signal having a frequency equal to that of the synchronizing signal to said oscillator means, a frequency of the sampling clock signal being adjusted based on the voltage signal.

18. A clock information transmitting means as claimed in claim 16, wherein said PLL means further comprises phase comparator means for outputting a voltage signal based on a phase difference between the synchronizing signal and a signal received from said frequency divider means to said oscillator means, a frequency of the sampling clock signal being adjusted based on the voltage signal.

19. A clock information transmitting means as claimed in claim 13, wherein said transmission signal is a video signal including a horizontal synchronizing signal corresponding to said synchronizing signal.

20. A clock information transmitting device as claimed in claim 13, wherein said further signal has a frequency nearly equal to twice a frequency of the synchronizing signal.

21. A clock information transmitting means as claimed in claim 13, further comprising error correction code generating means, coupled to said clock information generating means for generating an error correction code from said clock information and for adding the error correction code to the clock information.

* * * * *